Dec. 12, 1961    L. J. ZERBEE    3,012,256
VENTILATING AND SHOCK ABSORBING CUSHION
Filed Feb. 6, 1958    2 Sheets-Sheet 1

INVENTOR.
LOUIS J. ZERBEE
BY
HIS ATTORNEYS

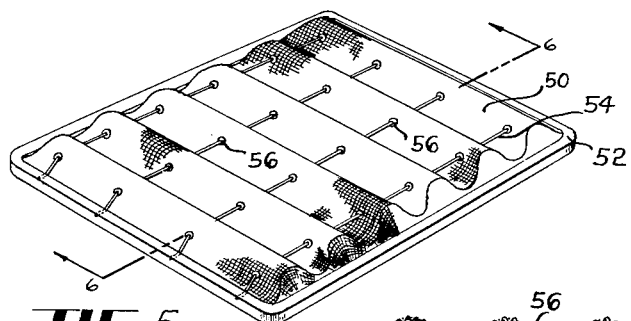
FIG. 5
FIG. 6
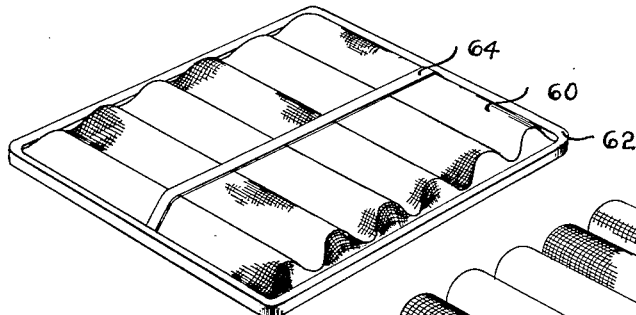
FIG. 7
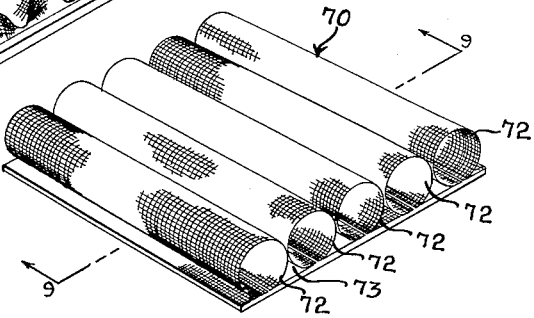
FIG. 8
FIG. 9
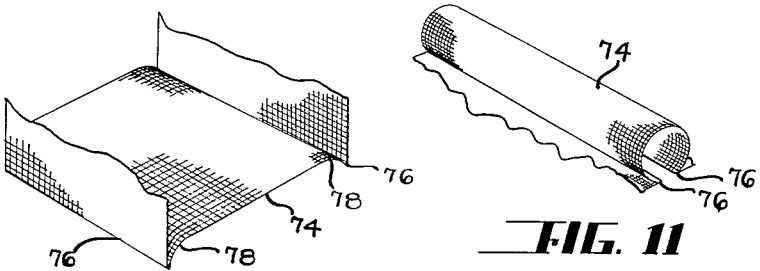
FIG. 10
FIG. 11
INVENTOR.
LOUIS J. ZERBEE
BY
HIS ATTORNEYS United States Patent Office 3,012,256
Patented Dec. 12, 1961

3,012,256
VENTILATING AND SHOCK ABSORBING
CUSHION
Louis J. Zerbee, 301 Chillicothe Ave.,
Bellefontaine, Ohio
Filed Feb. 6, 1958, Ser. No. 713,748
2 Claims. (Cl. 5—347)

This invention relates to improvements in ventilating and shock absorbing cushions, and more particularly to the use of reticulated or woven material in fabricating the yielding or cushioning elements for such cushions.

An object of this invention is to provide a ventilating cushion having the characteristic of yielding to conform to the contour of the body of the user, yet having sufficient rigidity that an air space will be maintained in the cushion.

Another object of this invention is to provide a cushion manufactured from one or more woven or reticulated screen layers which have been deformed in an orderly manner to establish an air space in the cushion, the construction and arrangement being such that the screen material will not collapse in use.

A further object of this invention is to provide a cushion manufactured from one or more woven or reticulated screen layers which have been deformed in an orderly manner to establish an air space in the cushion, and which are reinforced against collapse in a manner which does not impair the flexibility of the cushion.

Still another object of this invention is to provide a cushion comprising superimposed sheets of corrugated reticular screen material, the superimposed sheets being bonded together by an elastomeric substance.

Still another object of this invention is to provide a cushion comprising superimposed corrugated or undulated screen layers sandwiched between substantially planar screen layers such that uniform external surfaces are provided for the cushion.

Still a further object of this invention is to provide a cushion comprising deformed metallic reticular screens sandwiched between substantially planar metallic reticular screens, the latter being partially coated with an elastomeric substance to provide smooth external surfaces for the cushion.

Still a further object of this invention is to provide a cushion formed of a resilient woven or reticulated material wherein the material is shaped into parallel tubular rib portions, the tubular rib portions functioning as cushioning elements.

Other objects and advantages reside in the construction of parts, the combination thereof, the method of manufacture and the mode of operation, as will become more apparent from the following description.

In the drawings, FIGURE 1 is a perspective view of the ventilating cushion of this invention adapted for use as an automobile seat cushion, with parts broken away to reveal inner structural detail.

FIGURE 5 is a perspective view of a second modification.

FIGURE 6 is a sectional view taken substantially along the line 6—6 of FIGURE 5.

FIGURE 7 is a perspective view of a third modification.

FIGURE 8 is a perspective view of a fourth modification.

FIGURE 9 is a sectional view taken substantially along the line 9—9 of FIGURE 8.

FIGURE 10 is a fragmentary perspective view illustrating one step in the fabrication of the modification of FIGURE 8.

FIGURE 11 is a perspective view illustrating a fragmentary portion of the modification of FIGURE 8 as it appears at an intermediate stage of formation.

Figure 1:
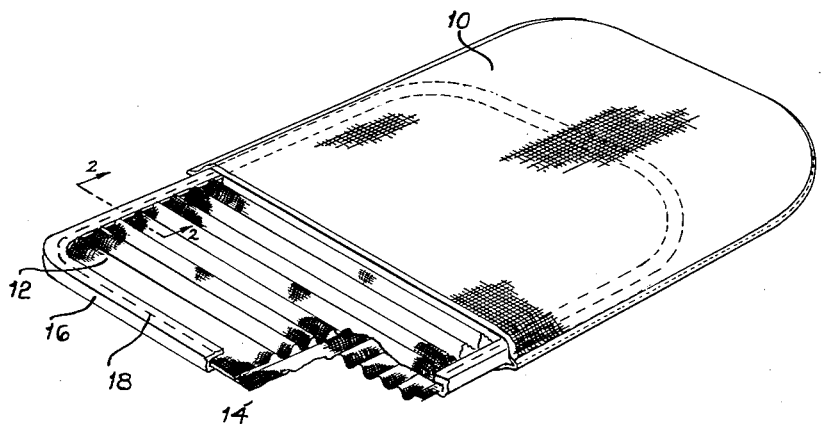
Figure 2:
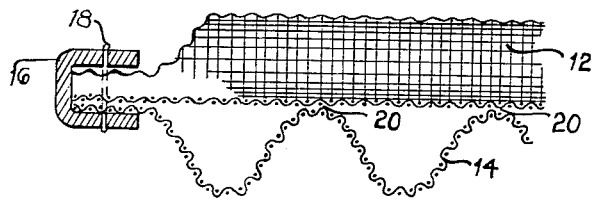
FIGURE 2 is an enlarged, fragmentary, sectional view taken substantially along the line 2—2 of FIGURE 1.

Referring to the drawings in detail, one embodiment of the ventilating cushion of this invention is illustrated in FIGURES 1 and 2. Reference numeral 10 identifies a fabric envelope which is to receive the ventilating cushion of this invention. This fabric envelope may be formed from any suitable woven or reticulated material such as jute or hemp, sisal, linen, cotton, straw, grass, plastic, glass fibers or the like, or it may comprise a porous envelope of paper fiber or another suitable material. The envelope 10 and the cushion therein are designed for use as a ventilating pad on chairs, automobile seats, theatre seats, stadium seats and so on, however, it will become apparent in the following that the cushion of this invention has independent utility, the envelope being illustrated and described merely for the purpose of demonstrating one application for the cushion.

Functionally, the ventilating pad must yield somewhat to conform to the body shape of the user, but must be sufficiently rigid that it will not collapse in use, cutting off the flow of air under the user. The requirements for resiliency or yieldability are particularly important when the cushion is to be used on padded automobile seats or theatre seats, or the like, as these seats are engineered to conform to the body shape of the user.

With these requirements in view, the cushion member of FIGURES 1 and 2 will now be described. Referring to FIGURE 1 of the drawing, the cushion member comprises an upper corrugated or undulated sheet of open mesh metallic screen 12 and a lower corrugated sheet of open mesh metallic screen 14. As is evident in FIGURE 1, the corrugations of the upper sheet 12 are parallel and extend at right angles to the corrugations in the lower sheet 14. The superimposed sheets or layers 12 and 14 are secured together by means of a marginal binding indicated by the reference numeral 16, which binding is stitched to the screen layers by means of stitches indicated by the reference numeral 18.

The binding 16 is formed of a tough canvas-like cloth, a plastic, or a rubber-like elastomeric material, or the like. By making this material tough, the sharp ends of the individual wire strands forming the screen layers 12 and 14 are contained by the binding, thereby establishing a smooth margin for the cushion.

While the binding has been stitched to the cushion in the present embodiment, it is to be understood that other means for securing the binding may be employed. For example, a plastic binding may be molded or otherwise bonded to the margins of the cushion; or the binding may take the form of an articulated metallic binding crimped to the margins of the cushion. With reference to FIGURE 2, it is to be noted that the corrugated screen layers are compressed at the margins into a tight sandwich to receive the binding.

With the foregoing construction, the individual sheets or layers 12 and 14 make substantial point contact at spaced intervals where the crests 20 in the corrugations of the upper sheet 12 engage the like crests 20 of the corrugations in the lower sheet 14. An air space equal substantially to twice the height of the corrugations is thereby provided in the cushion. The individual corrugations must be self-sustaining against compressive forces tending to press out the corrugations, but yet must be sufficiently yieldable to enable the cushion to conform to the body shape of the user. In general, the ability of the cushion to satisfactorily conform in shape, and the ability of the individual corrugations to resist collapse, will depend upon the strength of the individual strands employed in forming the screens, the mesh of the screens, the height of the corrugations therein, and the distance between corrugations. While the provision of ventilating air spaces in the cushion has been stressed in the foregoing, this construction also produces a cushion having excellent shock absorption characteristics.

A wide variety of metallic screen materials ranging from special screens woven from high tensile strength wire strands to ordinary household wire insect screening have been satisfactorily employed in the practice of this invention. It is to be understood, of course, that the present invention is not confined to the use of woven screens and may utilize any porous reticulated screen material. It is to be further understood that the screen material need not be metallic and may comprise, for example, a reticulated network of any suitable organic or mineral fibers.

The number of screen corrugations superimposed in the practice of this invention may be varied depending upon the structural and ventilating requirements imposed on the cushion. For example, an auto seat cushion may require two or more superimposed corrugated screens in the seat portion but may require only a single corrugated screen layer in the back rest portion.

Figure 3:
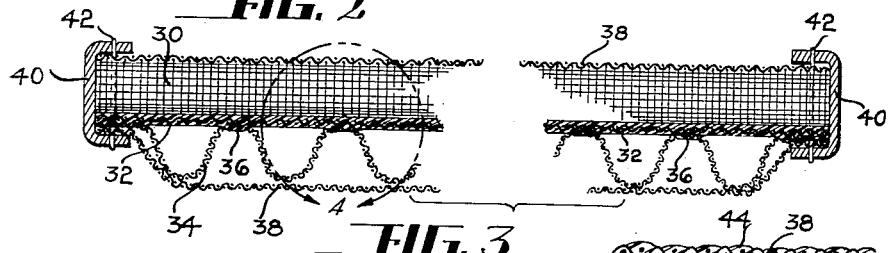
FIGURE 3 is a sectional view analogous to that presented in FIGURE 2 illustrating a first modification.
Figure 4:
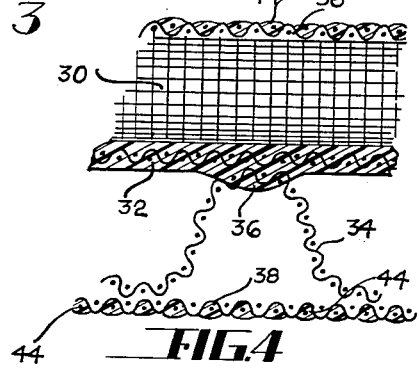
FIGURE 4 is a greatly enlarged sectional view of the area bounded by the arcuate line 4 of FIGURE 3.

The modification of FIGURES 3 and 4 illustrates one means whereby cushions of improved strength and shock absorption characteristics may be made. This cushion is made in the following manner. A sheet of corrugated or undulated screening material 30 has embedded in the foramina thereof and elastomeric substance 32 such as neoprene, this elastomeric substance being confined to the crests of the corrugations on one side of the corrugated screen. This elastomeric substance, which is initially in the uncured state, may be applied by dipping one surface of the corrugated screening material into a very shallow tray containing the elastomeric material, or by brushing the material onto the screen corrugations, or by any other suitable means. A lower sheet of corrugated screen material 34 is treated with elastomeric material in a similar manner at 36. The two layers 30 and 34 are then superimposed one on top of the other with the treated surfaces thereof in contact, whereupon the elastomeric substance is cured, as by heating, so as to form a bond between the individual layers 30 and 34.

With this construction there is provided a bond between the sheets 30 and 34 at every crossing between the corrugations of the two sheets where these sheets engage in substantial point contact. The provision of this elastomeric bond establishes an interaction between the two corrugated sheets such that the corrugations in one sheet support the corrugations in the adjacent sheet, increasing the resistance of these corrugated sheets to collapse under pressure. It is apparent that similar results may be obtained by means other than an elastomeric bond. Thus, the screens may be stitched or tied together at the points of contact, or they may be stapled, welded, or riveted together.

FIGURE 3 also illustrates the use of substantially planar screen layers 38 on the opposite sides of the superimposed corrugated layers 30 and 34. These planar screen layers 38 provide smoothened surfaces for the cushion.

In this cushion construction, it is frequently desirable that the opposite surfaces of the cushion have a smooth finish which is less harsh than that encountered with ordinary woven wire screen materials. Such a finish is obtained by depositing globules of an elastomeric substance at the crossings between warp and weft wire strands of the outer screen layers 38 of the cushion, as illustrated at 44 in FIGURE 4. These globules may be applied by dipping the sheets 38 in an uncured elastomer, then exposing these sheets to a strong air stream to blow elastomer out of the foramina of the screen, or they may be applied by spraying the external surfaces of the sheet 38 lightly with an elastomeric substance. Curing of the globules may be accomplished simultaneously with curing of the bonding substance 32, or curing of these two elastomer applications may be accomplished separately.

The margins of the cushion are enclosed by a tough binding material illustrated at 40 which is secured to the edges of the various screen layers by means of stitches 42, or by any other suitable means. So as not to obscure detail, the margins of the cushion of FIGURE 3 are illustrated in an expanded or uncompressed condition. In actual practice it is preferred to compress or crimp the margins of the cushion as the binding is secured in place.

In connection with the embodiments of FIGURES 1 through 4, it is to be noted that a single corrugated or undulated layer of porous screening material as employed in these modifications will have normal flexibility in the direction normal to the corrugations in the screen layer but will have considerably reduced flexibility in the direction parallel to the corrugations. When two such corrugated screen layers are superimposed with the corrugations of the superimposed layers extending angularly, the flexibility of the resultant cushion is substantially equal in all directions but is markedly lower than would be the case if the cushion were formed of but a single layer of corrugated screening material. In some uses for the cushion of this invention, particularly where the cushion is to be used on automobile seats or the like, it is highly desirable that the individual cushion members have maximum flexibility.

A cushion having improved flexibility is illustrated in FIGURE 5. This cushion comprises a single corrugated or undulated reticulated wire screen 50, the margins of which have been flattened and encased with a suitable binding 52. A plurality of flexible strands 54 are threaded in a straight line through the corrugations of the screen 50 and anchored at opposite sides of the cushion by the binder 52. These strands 54 may be rope, wire, or any other suitable material.

The strands 54, which are stretched taut when threaded through the corrugations of the screen 50, are bonded to the screen at each point of penetration thereof as illustrated at 56. In the case where both the strands 54 and the screen 50 are metallic, the bond 56 may be formed with solder or the like, or it may be formed with an elastomeric substance. It is found that where the strands 54 are smooth flexible wire elements, they may be coated with a thin coating of uncured elastomeric material such as neoprene, then threaded through the corrugated screen 50 and then exposed to elevated curing temperatures, whereupon the elastomeric coating will draw itself into globules at the junctures between the screen 50 and the strands 54. Where either the screen 50 or the strands 54 are non-metallic, an elastomeric bond such as is provided by neoprene is preferably employed.

With several strands 54 thus secured to the single layer cushion, as illustrated in FIGURE 5, the individual corrugations of the cushion are reinforced against collapse. Due to the fact that the strands 54 are flexible, however, the flexibility of the cushion 50 in the direction normal to the corrugations of the screen layer is not materially impaired by the presence of the strands 54.

For some applications it is found that no reinforcement for the corrugations of the single layer cushion is required. This is particularly true when the cushion is to be used under light loads, as is the case with a back rest cushion in an automobile. FIGURE 7 illustrates an unreinforced corrugated or undulated screen layer 60 used as a cushion without reinforcement for the corrugations. In constructing the cushion, the margins of the screen layer 60 are flattened and encased by a binder 62. This cushion has a high degree of flexibility in the direction normal to the corrugations in the screen layer 60. It may even be so flexible that in use it will tend to curl about the user. This behavior is corrected through the use of a flexible strap 64, as illustrated in FIGURE 7, spanning the corrugations of the cushion and anchored thereto by the binder 62. This strap 64, which may be rubber or plastic, for example, limits the extent to which the cushion will curl under load.

FIGURES 1–7 of the drawings illustrate four embodiments of the present invention, each characterized by the use of a linearly corrugated or undulated porous screen layer which functions first to provide open air spaces, and second to provide resiliency and yieldability in a cushion member. It is to be understood that linear corrugations are not essential to the invention, it being within the purview of this invention to deform the screen layers for the cushions in any other orderly manner so as to establish an air space in the cushion. As an example, the corrugations or undulations may be made circular and concentric, or they may be made spiral in the plane of the screen. As a further example, the deformation of the screen layers may be accomplished by pressing small circular mounds in the screen layers at spaced intervals so as to form hills and valleys therein.

FIGURES 8–11 illustrate a fifth embodiment wherein the undulatory characteristic of the screen layer is obtained in a novel manner. Referring to FIGURE 10 of the drawings, there is illustrated a fragmentary portion of woven or reticulated porous screen material 74 provided with a pair of sharp spaced creases 76. The creases 76 are obtained by folding the material a full 180°, the two creases being formed with oppositely directed folds.

FIGURE 11 illustrates the shape that the screen 74 will assume when the two creases 76 are brought into close proximity. As appears in FIGURE 11, the screen 74 assumes the shape of a hollow cylinder between the creases 76. Ordinarily, the cylinder formed would be pear-shaped. The substantially circular shape illustrated in the drawings is obtained by artificially curving the material adjacent the creases 76, as illustrated at 78 in FIGURE 10. This artificial curve may be introduced in the screen material by any suitable means.

FIGURE 8 illustrates the cushion which results when a sheet of screen material 70 is repeatedly creased and flexed in the manner illustrated in FIGURES 10 and 11, to form a plurality of parallel contiguous tubular, nearly cylindrical, rib elements 72. It is apparent that each of the rib elements 72 is under tension such that supplemental means must be employed to retain the illustrated shape. One means for accomplishing this is to adhere a cloth layer 80 to the underside of the cushion formed by the screen 70 by means of an elastomeric bond illustrated at 82 in FIGURE 9. This elastomeric bonding layer 82 may partially or fully envelop the planar portions 73 of the screen 70 which connect the tubular ribs 72 formed therein.

Due to the fact that the rib elements 72 of the cushion of FIGURES 8 and 9 are always under tension this cushion will support a considerable weight without collapse and no reinforcement for the rib elements 72 is required. The screen 70 being porous and the rib elements 72 being hollow this cushion is an excellent ventilating cushion.

It is found that the cushion is attractive in appearance in and of itself and need not be enclosed in an envelope such as illustrated at 10 in FIGURE 1. A colorful appearance may be imparted to the cushion by coating the strands making up the screen layers 70 with a suitable lacquer and, if desired, by dusting the cushion before the lacquer is dry with suitable fibers to give a textured appearance to the cushion. This may be done without markedly reducing the porosity of the cushion.

Preferably, in constructing the cushion member of FIGURE 8, the margins of the screen 70 extending normal to the rib elements 72 formed therein are selvages, formed so as to be substantially non-snagging. The margins extending parallel to the rib elements 72 are made non-snagging by immersion in the elastomeric layer 82, or they may be protected by a suitable marginal binder, not illustrated. Any tendency for clothing and buttons to become snagged between adjacent rib elements 72 may be minimized, among other ways, by bonding the rib elements together at their points of contact, as illustrated at 84 in FIGURE 9, or by partially filling in the channels formed between the rib elements with a suitable packing.

For the purposes of discussion, it is helpful to regard the strands of the screen 70 extending normal to the rib elements 72 as warp strands and those extending parallel to the rib elements as weft strands even though the screen 70 is not necessarily woven as these terms would imply. With regard to the cushion of FIGURE 8, it is apparent that only the warp strands are functioning to impart resiliency to the cushion. The weft strands function only to space the warp strands and to prevent collapse of the cushion by locking the warp strands in an upright position. These considerations make it clear that the number of weft strands required in the cushion is considerably smaller than the number of warp strands required. Accordingly, it is deemed within the purview of this invention to construct the cushion of FIGURE 8 with screens having a low concentration of weft strands as compared to warp strands. For example, the warp strand spacing may be eight to ten strands per inch whereas the weft strand spacing may be only three or four strands per inch.

In the foregoing, the cushion of this invention has been described in connection with utility as a ventilating and shock absorbing pad for automobile seats or the like. It will be apparent, however, that the cushion has other important applications. As an example, the pad may be used as a substitute for materials such as excelsior, latex and hair, latex and fiber, or the like, which are used both as seating and packing materials. The cushion has particular utility as a shock absorbing packing for use in shipping delicate instruments and the like.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A pliable cushion member including at least one undulatory layer of reticulated fabric, means for holding the undulations thereof in substantially fixed relation one to the other so as to support said undulations against collapse, said means comprising a plurality of straight flexible strands passing through said fabric in a direction normal to the undulations thereof, said strands repeatedly penetrating said fabric as they pass through successive undulations, and means for anchoring said strands to said fabric at each point of penetration thereof.

2. A cushion member comprising resilient material undulated between spaced planes so as to form a cushion, the thickness of which corresponds to the distance between the planes, said undulations being in the form of corrugations, means disposed intermediate said spaced planes securing the adjacent undulations of said cushion in fixed relation, said means comprising a plurality of straight flexible strands passing through said material in a direction normal to the undulations thereof, said strands repeatedly penetrating the material as they pass through the successive undulations thereof, and means for bonding said strands to the material at each point of penetration thereof.

References Cited in the file of this patent

UNITED STATES PATENTS

| | | |
|---|---|---|
| 479,999 | Thompson | Aug. 2, 1892 |
| 1,156,895 | Flipse | Oct. 19, 1915 |
| 1,589,419 | Norris | June 22, 1926 |
| 1,902,361 | Hamersley | Mar. 21, 1933 |
| 2,308,050 | Burr | Jan. 12, 1943 |

FOREIGN PATENTS

| | | |
|---|---|---|
| 163,846 | Australia | July 4, 1955 |